(12) United States Patent
Auterinen (10) Patent No.: US 7,423,962 B2
(45) Date of Patent: Sep. 9, 2008

(54) REDUNDANCY AND LOAD BALANCING IN A TELECOMMUNICATION UNIT AND SYSTEM

(75) Inventor: Otso Auterinen, Helsinki (FI)

(73) Assignee: Nokia Corporation, Espoo (FI)

( * ) Notice: Subject to any disclaimer, the term of this patent is extended or adjusted under 35 U.S.C. 154(b) by 814 days.

(21) Appl. No.: 10/487,252

(22) PCT Filed: Jun. 19, 2003

(86) PCT No.: PCT/FI03/00507

§ 371 (c)(1),
(2), (4) Date: Feb. 20, 2004

(87) PCT Pub. No.: WO2004/004216

PCT Pub. Date: Jan. 8, 2004

(65) Prior Publication Data

US 2004/0198372 A1    Oct. 7, 2004

(30) Foreign Application Priority Data

Jun. 28, 2002    (FI) ................................. 20021287

(51) Int. Cl.
*G06F 11/22* (2006.01)
(52) U.S. Cl. ....................... 370/216; 370/217; 370/220
(58) Field of Classification Search .......... 370/216–220
See application file for complete search history.

(56) References Cited

U.S. PATENT DOCUMENTS

| 4,271,507 | A | * | 6/1981 | Gable et al. .................. 370/432 |
| 5,014,261 | A | * | 5/1991 | Shinbashi et al. ........... 370/220 |
| 6,108,409 | A | * | 8/2000 | Cooper et al. ............... 379/230 |
| 6,148,410 | A | | 11/2000 | Baskey et al. |
| 6,157,643 | A | | 12/2000 | Ma |
| 6,295,276 | B1 | | 9/2001 | Datta et al. |
| 6,363,453 | B1 | * | 3/2002 | Esposito et al. ................ 711/2 |
| 6,392,989 | B1 | | 5/2002 | Jardetzky et al. |
| 6,487,605 | B1 | * | 11/2002 | Leung ......................... 709/245 |
| 6,532,231 | B1 | * | 3/2003 | Blumberg et al. ........... 370/360 |
| 6,574,477 | B1 | * | 6/2003 | Rathunde ..................... 455/453 |

(Continued)

FOREIGN PATENT DOCUMENTS

EP    1 091 602 A2    4/2001

(Continued)

*Primary Examiner*—Aung S. Moe
*Assistant Examiner*—Andrew Lai
(74) *Attorney, Agent, or Firm*—Squire Sanders & Dempsey L.L.P.

(57) ABSTRACT

The invention relates to backing up a network element (NE) in a telecommunications system. The network element (NE) comprises at least two cluster nodes (A, B, C) that are redundancy units of each other. Each cluster node (A, B, C) contains virtual nodes (a1, a2, b1, b2, c1, c2). Pairs are formed of the virtual nodes (a1, a2, b1, b2, c1, c2) in such a manner that the first virtual node of the pair resides in the first cluster node and the second virtual node in the second cluster node. One of the virtual nodes in the pair is active and the other on standby. When a cluster node malfunctions, the virtual nodes of the pairs whose active virtual nodes reside in the faulty cluster node are interchanged by changing the standby virtual nodes to active and the active virtual nodes to standby.

50 Claims, 4 Drawing Sheets

U.S. PATENT DOCUMENTS

2002/0186653 A1* 12/2002 Jensen ..................... 370/219
2003/0117983 A1    6/2003 Ton et al.

FOREIGN PATENT DOCUMENTS

| JP | 10285202 A | 10/1998 |
| JP | 11261620 | 9/1999 |
| WO | WO 03/013065 | 2/2003 |

* cited by examiner

REDUNDANCY AND LOAD BALANCING IN A TELECOMMUNICATION UNIT AND SYSTEM

BACKGROUND OF THE INVENTION

The invention relates to the redundancy of network elements and to load balancing in a telecommunications system, and especially to using parallel gateway nodes, such as GGSNs (Gateway GPRS support node) in a packet-switched mobile system. To provide a concrete example, the invention will be described in the context of a packet-switched mobile communication system.

The continuous development of applications transmitted in mobile systems sets ever increasing demands on mobile networks. An efficient use of the radio network determining the capacity of the system is important to enable extensive traffic. Packet-switched connections are more efficient than circuit-switched connections in many applications. They are especially well suited for burst data transmission, such as for the use of the Internet. A high bit rate is then required to load a new page, but, on the other hand, data traffic is almost non-existent when the page is viewed. In circuit-switched connections, the capacity of the connection is, however, all the time reserved for a certain user, whereby resources are wasted and the user must also pay for this. In a packet-switched system, resource allocation is based on the amount of transmitted data and not the duration of the connection.

GPRS (General packet radio service) is a technique enabling packet-switched data transmission that will be utilized in the third-generation mobile network UMTS (Universal mobile telecommunications system), for instance. GPRS requires the introduction of new network elements, such as GGSN, in the mobile system. GGSN is the network element of the GPRS and UMTS mobile networks and controls the routing of data packets in the GPRS network and takes care of connecting the GPRS network to other networks, such as the Internet and other GPRS networks.

In the GPRS system, the logical connection between a mobile station and GGSN supporting the mobile station is called a PDP (Packet data protocol) context. A redundant GGSN node comprises several GTP-U (GPRS tunnelling protocol-User plane) and GTP-C (GPRS tunnelling protocol-Control plane) processing units that apply packet transmission based on PDP contexts. Redundancy is used in the GTP-U and GTP-C processing units to continue transmitting packets even in error situations. The redundancy is based on having a second processing unit take over, if the primary unit cannot continue transmitting packets. The redundancy of network nodes, such as GGSN, is typically implemented using backup units with a redundancy ratio of 1:1, whereby there is one backup unit for each active unit. The problem with 1:1 redundancy is that it makes the structure of the network node heavy and expensive, if every processing unit is to be backed up.

BRIEF DESCRIPTION OF THE INVENTION

It is thus an object of the invention to solve the problem. It is an object of the invention to lower the hardware overhead to obtain redundancy. The object is achieved by developing a method and a system implementing the method and a network element that are characterized by what is stated in the independent claims. Preferred embodiments of the invention are disclosed in the dependent claims.

The invention is based on using clusters, comprising parallel network element units, called cluster nodes, for backing up a network element, such as GGSN. A cluster node is an example of a GTP-U or a GTP-C processing unit capable of serving PDP context activation requests. Processing units serve as backup units for each other. The cluster nodes include logical nodes that represent the pairs formed of the cluster nodes in such a manner that a pair of logical nodes is associated with each pair, and one of the logical nodes resides in the first cluster node and the other in the second cluster node. In the logical node pair, one of the logical nodes is active and the other is on standby. A directed logical node pair, which indicates the active and standby logical node, is referred to as a load allocation alternative.

GGSN redundancy is then based on the idea that when a user plane node malfunctions, the PDP contexts whose active logical node resides in the faulty cluster node will be served by the standby logical node of the pair, which thereafter becomes the active logical node.

The method, system and network element of the invention provide the advantage that 1:1 redundancy is not needed in the system and a pair can be defined for each cluster node even if there is an odd number of cluster nodes, for instance three. This way, when one cluster node malfunctions, only 33% of the PDP contexts need to be transferred to be served by another cluster node assuming that the load of the network element is divided between three cluster nodes.

In one embodiment of the invention, the network load is balanced in such a manner that when activating a PDP context, a logical node can be selected as the active node from the cluster node that has the least load. This embodiment also provides the advantage that one solution is provided for both network element load balancing and unit redundancy. This way, the system becomes resilient, i.e. has high availability and reliability. This is advantageous especially in a situation in which only a part of the sessions must have high availability. This embodiment is especially well suited for an environment comprising several all-IP-GGSN (Internet protocol) units based on solely packet-switched data transmission, in which resiliency and availability are required of the system. A further advantage of this embodiment is that it alleviates the problem related to load balancing based on IP-based packet transmission, i.e. the fact that the transmission rate can decrease significantly when the load increases.

The invention also provides a combined resiliency solution for the GTP-C and GTP-U processing units.

BRIEF DESCRIPTION OF THE FIGURES

The invention will now be described in greater detail by means of the preferred embodiments and with reference to the attached drawings, in which.

DETAILED DESCRIPTION OF THE INVENTION

The present invention can be applied to any telecommunications system in which network element redundancy is implemented using, together with active units, standby units that can be activated when the active unit malfunctions. These systems include third-generation mobile systems, such as UMTS (Universal mobile telecommunications system), and systems based on them, and the systems, such as GSM 1800 and PCS (Personal communications system), corresponding to the GSM system (Global system for mobile communications). The invention can also be applied to other wireless systems and fixed systems.

In the following, the invention is described using an example system that is based on a 3GPP-all-IP system, without restricting the invention thereto, however. 3GPP-all-IP is an IP technology-based system utilizing GPRS defined in the Third-generation partnership project 3GPP, in which system network element redundancy is implemented using parallel backup units.

Figure 1:
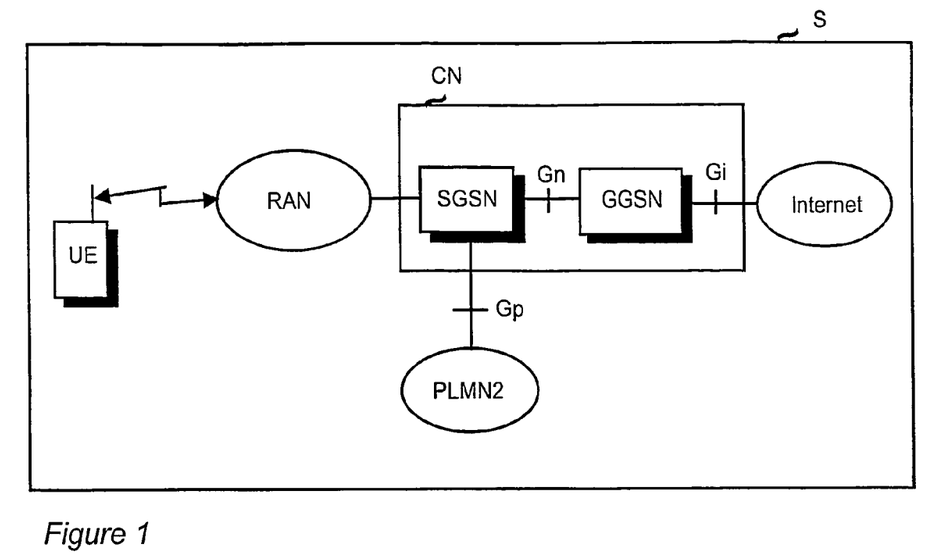
FIG. 1 is a block diagram of a simplified system of the invention.

FIG. 1 shows a simplified GPRS architecture that only shows the parts that are essential for understanding the invention. It is apparent to a person skilled in the art that a mobile system also comprises other functions and structures that need not be described in detail herein.

The main parts of a mobile system are a core network CN, a radio access network RAN and a mobile station, also referred to as user equipment UE. The GPRS system uses a 3G radio access network (such as the UMTS radio access network) or a 2G radio access network (such as the GSM radio access network).

The GPRS core network CN can be connected to external networks, such as the Internet. The main parts of the core network CN are a serving gateway support node SGSN and a gateway GPRS support node GGSN. The core network described herein is based on the UMTS core network. Other types of core networks, for instance IS-41, can comprise other network elements.

The main functions of SGSN are detecting new GPRS mobile stations UE in its service area, processing the registrations of the new mobile stations UE, transmitting data packets to and from a GPRS mobile station UE and maintaining a register on the locations of the mobile stations in the service area.

The main functions of GGSN include interaction with an external data network. GGSN connects the GPRS network of the operator to external systems, such as the GPRS systems of other operators, and data networks, such as the Internet. GGSN contains the PDP addresses of the GPRS subscribers and routing information, in other words, the SGSN addresses. The SGSN-side interface of GGSN is called the Gn interface and the IP network-side interface is called the Gi interface. The interface between SGSN and a network managed by another network operator PLMN2 (Public land mobile network) is called the Gp interface. The operation of GGSN of the invention will be described later in connection with FIGS. 2, 3, 4, 5 and 6.

The mobile station UE can be a speech-only terminal or it can be a multi-service terminal that serves as a service platform and supports the loading and execution of different functions related to services. The mobile station UE comprises actual mobile equipment and, typically, a detachably attached identification card, also called a subscriber identity module, SIM. The mobile station can be any device or a combination of several different devices capable of communicating in a mobile system. The subscriber identity module typically includes the subscriber's identifier, executes authentication algorithms, stores authentication and encryption keys and subscriber information required in the mobile station.

To transmit and receive GPRS data, the mobile station UE must activate at least one PDP context that it wants to use. PDP refers to a protocol transmitting data in packets. This activation makes the mobile station known to the corresponding GGSN, and interworking with the network can begin. A PDP context defines different data transmission parameters, such as the PDP address, quality of service QoS and NSAPI (Network service access point identifier).

A mobile station connected to a GPRS system can at any time start PDP context activation by transmitting an activate PDP context request to SGSN. After receiving the message, SGSN transmits a create PDP context request to GGSN that creates the PDP context and transmits it to SGSN. SGSN transmits an activate PDP context acknowledgement to the mobile station UE in response to a successful PDP context activation, after which a virtual connection is established between the mobile station UE and GGSN. As a result, SGSN transmits data packets coming from the mobile station UE to GGSN and GGSN transmits data packets received from an external network through SGSN to the mobile station UE. The PDP context is stored in the mobile station UE, SGSN and GGSN. Without restricting it to the GPRS system, the PDP context is any logical context that is established for the transmission of packet-switched data between a terminal and the network element controlling the connection. One or more PDP contexts represent each PDP address in the mobile station UE, SGSN and GGSN.

GTP (GPRS tunnelling protocol) refers to a protocol that is used to transmit user data between GPRS nodes in the GPRS core network. Two PDP contexts on different interfaces and connected to each other form a GTP tunnel.

A system implementing the functionality of the present invention and its network element comprise not only prior-art means but also means for implementing the functions described in more detail in connection with FIGS. 2, 3, 4, 5, 6 or 7. To be more specific, they comprise maintenance means for maintaining virtual cluster nodes in the cluster nodes, means for forming load allocation alternatives of said virtual cluster nodes and/or means for changing the load allocation. In addition, the network nodes can comprise means for distributing the load to active cluster nodes, means for distributing the load of the network element between the cluster nodes, means for distributing the load of the network element on the basis of a load allocation plan, means for defining an external IP address for the load allocation alternatives, means for maintaining information on a primary and secondary cluster node associated with the load allocation alternative, switching means for transmitting data by using the IP address defined for the load allocation alternative and/or means for changing the load allocation internally in the network element. It is also possible that the system and its network nodes comprise all the above-mentioned means.

The present network nodes comprise processors and memory that can be utilized in the functions of the invention. All alterations required to implement the invention can be performed as added and updated software routines and/or using hardware-based solutions, such as ASIC (application-specific integrated circuit) circuits, or a separate logic.

In the following description, the terms 'control plane' (CP) and 'user plane' (UP) are used. All information transmitted and received by a mobile station user, such as coded voice data in voice calls or packets of an Internet connection, are transmitted on the user plane. The control plane is used for all control signalling related to the mobile system that is usually not visible to the user. There may be exceptions to this, for instance short messages can be transmitted on the control plane. On the radio interface, the control-plane and user-plane data can be multiplexed to the same physical channel.

Implementation of the First Embodiment

The following describes, how the invention is implemented on the user plane.

Figure 2:
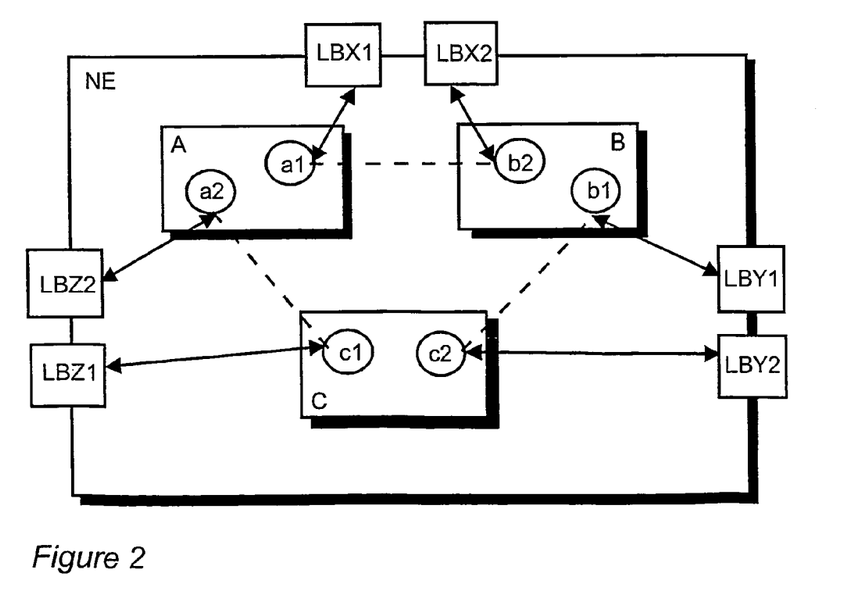
FIG. 2 is a schematic representation of external IP addressing of the invention on the user plane.

FIG. 2 shows a network element NE, which is for instance a GGSN node. The network element comprises two or more physical GTP-U processing units A, B, C, which are herein also called cluster nodes. The cluster nodes A, B, C are capable of serving PDP contexts. The cluster nodes are arranged in pairs such that each cluster node can form a pair with every other cluster node. For instance, if the number of available cluster nodes N=3, the number of possible pairs P=3. If N=4, then P=6. In the situation shown in FIG. 2, the number of cluster nodes N=3, and the possible cluster node pairs are then AB, BC and CA. In each pair, the first cluster node is a backup unit of the second cluster node.

According to the present invention, the cluster nodes contain logical nodes a1, a2, b1, b2, c1, c2, which are also called virtual cluster nodes or virtual nodes. The number of virtual nodes is preferably twice the number of the pairs formed of the cluster nodes. The virtual cluster nodes a1, a2, b1, b2, c1, c2 are logical GTP-U processing units. They are arranged in pairs in such a manner that the first virtual node of the pair is active and the second is on standby. The same cluster node can comprise both active and standby virtual nodes.

A directed virtual node pair has a feature visible outside the network element called a load allocation alternative LBX1, LBX2, LBY1, LBY2, LBZ1, LBZ2, which is a logical Gn, Gp or Gi interface. Table 1 shows the load allocation alternatives for three processing units A, B, C, and illustrates which of the virtual nodes of the load allocation alternative is active and which is on standby.

TABLE 1

| | | Virtual node | |
| Processing unit pair | Load allocation alternative | Active | Standby |
| --- | --- | --- | --- |
| AB | LBX1 | a1 | b2 |
| | LBX2 | b2 | a1 |
| BC | LBY1 | b1 | c2 |
| | LBY2 | c2 | b1 |
| CA | LBZ1 | c1 | a2 |
| | LBZ2 | a2 | c1 |

Two or more virtual node pairs formed in an equal manner can have different load allocation alternatives which may have other differences apart from the formulation of the virtual node pair.

Each load allocation alternative has an external IP address that is used as the user plane address of the PDP context. When a PDP context activation request is processed in GGSN, one of the load allocation alternatives is selected. A serving virtual node, i.e. active node, and a standby virtual node is selected. The selection is based for instance on the load information of the cluster nodes or a specific alternating diagram.

If a cluster node A, B, C malfunctions, allocation of the PDP contexts, whose active unit this cluster node is, is changed. The active virtual node serving the PDP context is put on standby and the corresponding standby virtual node becomes active, unless it happens to be faulty as well. In this description, the change of the active and standby unit is also referred to as a 'switchover'. When the corresponding standby units become active, they start serving the PDP contexts.

Each load allocation alternative has an individual external user plane IP address at the Gn or Gp interface for receiving the data packets that arrive at GGSN. This individual address of the load allocation alternative is used as the PDP context address of the active virtual node of the load allocation alternative. It is the feature of the load allocation alternative that is visible at the external interfaces of the network element. The IP address is used to indicate the route through the physical interface of the cluster node A, B, C.

The traffic in the network element NE may be distributed between the cluster nodes that comprise active virtual nodes on the basis of a specific load allocation plan. The traffic in the network element NE may be distributed between the cluster nodes that comprise standby virtual nodes, whereby the standby virtual nodes are made active.

Implementation of the First Embodiment Using an Internal Switch

Figure 3:
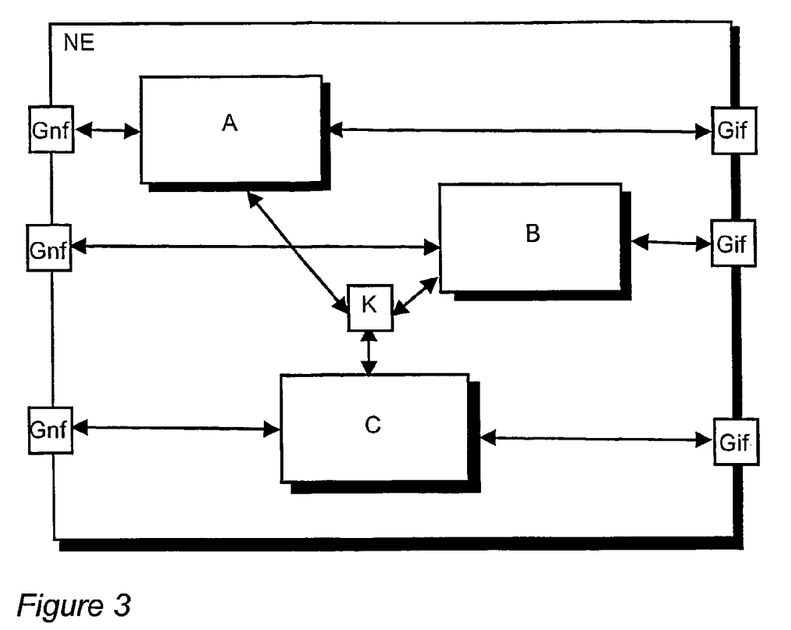
FIG. 3 is a schematic representation of load balancing of the invention on the user plane, when a high-speed internal switch is available.

FIG. 3 shows an implementation of the invention on the user plane, when GGSN has a high-speed internal switch K or a corresponding connection between the cluster nodes A, B, C. By means of the internal switch K, any alterations required to recover from faults can be hidden at the interfaces of the network element, whereby the change of the active cluster node to the standby node and vice versa is not visible outside the network element NE. Packets arriving at the physical Gi interface Gif or the Gn interface Gnf of the cluster node A, B, C are transmitted through the internal switch K to the active cluster node. For the sake of clarity, FIG. 3 shows one switch K, but in reality, there may be several switches. Gnf could also illustrate the Gp interface.

According to a preferred embodiment of the invention, load allocation is based on routing (routing-based link resiliency) protocols, in other words, information on a primary and secondary route to the load allocation alternative is maintained inside GGSN. The primary route is the physical interface of the cluster node comprising the active logical node of the load allocation alternative. The secondary route is the physical interface of the standby unit. When activating a PDP context, the load allocation alternative is offered from a cluster node A, B, C that has available capacity. The physical Gn interface Gnf or physical Gi interface Gif, at which the packets arrive in the network node, need not reside in the cluster node from which the load allocation alternative is offered. In other words, the packets can arrive at any interface and they are transmitted through the internal switch K of the network node to the active cluster node. Forwarding information is maintained in GGSN to enable indicating the primary and secondary route through the physical Gi or Gn interface of the cluster node to the active unit. The load allocation change or a switchover between the active unit and the standby unit is not visible outside the network element, because the external IP address of the load allocation alternative is the only address visible outside the network element. When the primary connection malfunctions, data packets are guided to use the secondary route of the load allocation alternative. A fault in the first interface (for instance Gn) of GGSN is not visible to the second interface (for instance Gi).

According to another preferred embodiment of the invention, load allocation is based on a link layer solution (link layer resiliency). In this case, too, the physical Gn interface Gnf or physical Gi interface Gif need not reside in the cluster node A, B, C, in which the active unit processes packets. In the link layer solution, a load allocation alternative has a physical interface dedicated for it, and the standby unit monitors the physical connection or interface Gif, Gnf of the active unit. Another GGSN component can also perform the task. If the standby unit receives information on a malfunction of the interface used by the active unit, the standby unit initiates the switchover. The standby unit then starts to use the backup interface instead of the dedicated physical interface Gif, Gnf of the faulty unit, and packets addressed to the faulty unit are directed to the standby unit through the internal switch K. In this embodiment, too, a switchover or an internal load allocation change of the load allocation alternative is not visible outside the network element as a change in the external IP address but as a change in the address on the link layer, because the IP address of the load allocation alternative is the only routing address visible outside the network element. When the primary connection malfunctions, data packets are guided to use the secondary route of the load allocation alternative. A fault in the first interface (for instance Gn) of GGSN is not visible to the second interface (for instance Gi).

According to yet another preferred embodiment of the invention, the above-mentioned solution based on routing and the solution of the link layer can be applied simultaneously, in which case first a quick recovery from the malfunction of the cluster node takes place based on the link layer solution and then a recovery based on the routing.

The visibility of a load allocation alternative may be on both sides of the network element NE. This means that there may be a similar feature of the load allocation alternative on the Gi and the Gn side of GGSN. The external addressing of the load allocation alternatives may be based for instance on the subnet address range used for the PDP context IP addresses, the IP tunnel endpoint address in case of a tunneling mechanism (such as Generic routing encapsulation GRE, IP-in-IP, or IP security protocol IPSec), or a set of label switched paths used by the load allocation alternative.

Methods for guiding data packets to use a secondary route to the load allocation alternative in a routing-based solution or for starting the use of an alternative physical interface in the link layer solution are described later in 'Changing of the physical interface' of this description.

Implementation of the First Embodiment Without an Internal Switch

Figure 4:
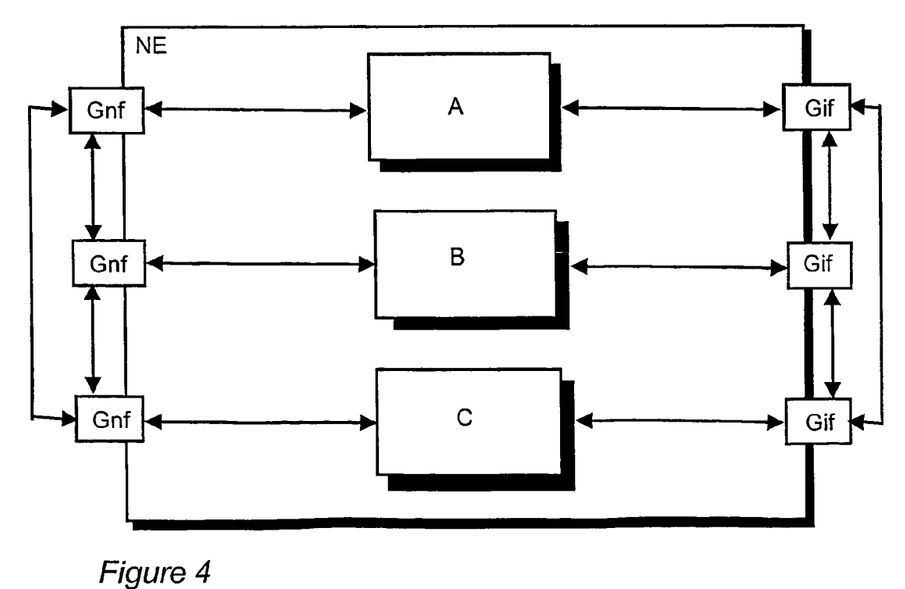
FIG. 4 is a schematic representation of load balancing of the invention on the user plane, when a high-speed internal switch is not available.

FIG. 4 shows an implementation of the invention on the user plane, when no high-speed internal switch is available in the network element. The switchover or the load allocation change is then not an internal network element change, but is visible outside. In other words, the route changes on both interfaces Gn, Gi.

In yet another preferred embodiment of the invention, an integrated load allocation change or switchover is performed. In a routing-based solution, data packets then arrive at the network element NE in such a manner that the external address of the load allocation alternative is marked as their IP address. The primary routes for transmitting data packets are the one that use the physical Gi interface Gif or physical Gn interface Gnf of the cluster node A, B, C, in which the active load allocation alternative resides. When the cluster node malfunctions, the secondary routes are used. When using the secondary routes, the packets arrive at the physical interface of the cluster node, in which the second load allocation alternative resides and which then becomes the active unit. The change of the route to the secondary route is visible outside the network element. Routing protocols can be used to indicate the secondary route on the physical interface.

In an integrated load allocation change of yet another preferred embodiment of the invention, it is possible to use a link layer solution that is based on the idea that the standby unit of the load allocation alternative monitors the physical Gi interface Gif and physical Gn interface Gnf of the active unit. Another GGSN component can also perform this task. If an error is detected, the standby unit starts to use the alternative physical interface of the faulty unit. Methods for changing the physical interface are described later in 'Changing of the physical interface' of this description. The standby unit can then start to use the alternative physical interface, if it is the standby unit of all the PDP contexts whose active unit the faulty unit is. This can be achieved by indicating routes on the physical interface of the standby unit that replaced the faulty unit. Because the Gn-side changes also need to be made on the Gi-side (and vice versa), a logical Gi interface (or Gn interface) is allocated for each load allocation alternative.

The routing solution or the link layer solution can be applied to the Gi interface regardless of which solution is applied to the Gn interface, and vice versa. Methods for guiding data packets to use a secondary route to the load allocation alternative in a routing-based solution or for starting the use of the alternative physical interface in the link layer solution are described later in 'Changing of the physical interface' of this description.

Implementation of the Second Embodiment

The following describes a combined user plane and control plane implementation of the invention.

Figure 5:
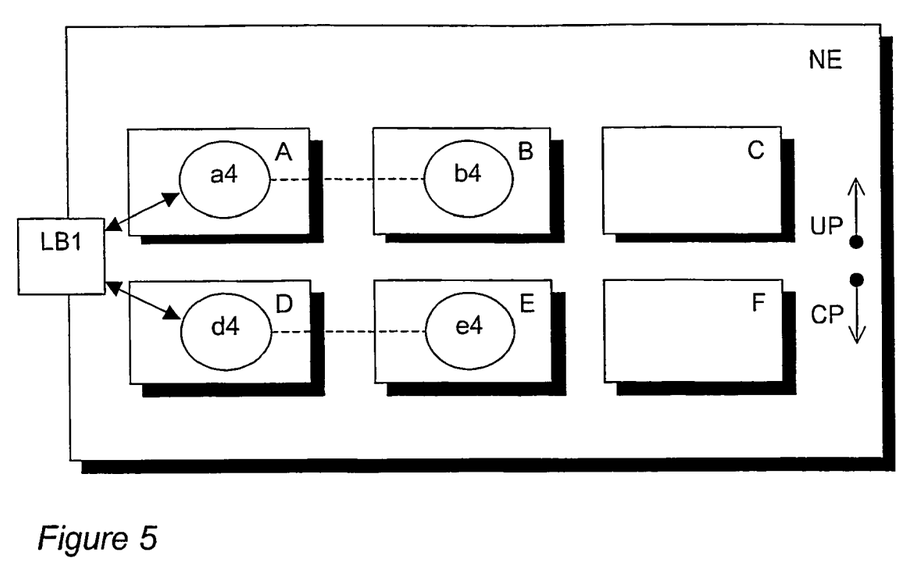
FIG. 5 is a schematic representation of external IP addressing of the invention on the user plane and control plane.

FIG. 5 shows a network element NE, which is for instance a GGSN node. The network element comprises two or more physical GTP-U processing units A, B, C, which are herein also called user plane cluster nodes, and two or more physical GTP-C processing units D, E, F which are herein also called control plane cluster nodes. The user plane and control plane cluster nodes A, B, C, D, E, F are capable of serving PDP contexts. According to the second embodiment of the invention, serving pairs are formed of the user plane and control plane cluster nodes such that a user plane cluster node and a control plane cluster node form a pair. In a serving pair, both of the nodes are active. Each user plane cluster node can form a pair with every control plane cluster node and vice versa. The serving pair has a backup pair on standby. Each backup pair can be the backup pair of every serving pair. The backup pair also comprises a control plane cluster node and a user plane cluster node.

According to this embodiment, the user plane and control plane cluster nodes comprise logical nodes, which are also called virtual cluster nodes or virtual nodes a4, b4, d4, e4. The virtual nodes are logical GTP-U or GTP-C processing units. The virtual nodes are arranged in pairs such that the first virtual node of the first pair resides in the GTP-U processing unit of the serving pair and the second virtual node of the first pair resides in the GTP-U processing unit of the backup pair, and such that the first virtual node of the second pair resides in the GTP-C processing unit of the serving pair and the second virtual node of the second pair resides in the GTP-C processing unit of the backup pair. The virtual node pairs are further arranged in secondary pairs such that the first virtual node pair resides in the GTP-U processing units and the second virtual node pair resides in the GTP-C processing units. Table 2 shows the possible serving pairs and backup pairs for three GTP-U processing units A, B, C and three GTP-C processing units D, E, F.

TABLE 2

| UP processing units | CP processing units | Serving pair + Backup pair |
|---|---|---|
| A, B | D, E | AD + BE |
|  |  | AE + BD |
|  |  | BE + AD |
|  |  | BD + AE |
| A, B | E, F | AE + BF |
|  |  | AF + BE |
|  |  | BF + AE |
|  |  | BE + AF |
| A, B | F, D | AF + BD |
|  |  | AD + BF |
|  |  | BD + AF |
|  |  | BF + AD |
| B, C | D, E | BD + CE |
|  |  | BE + CD |
|  |  | CE + BD |
|  |  | CD + BE |
| B, C | E, F | BE + CF |
|  |  | BF + CE |
|  |  | CF + BE |
|  |  | CE + BF |
| B, C | F, D | BF + CD |
|  |  | BD + CF |
|  |  | CD + BF |
|  |  | CF + BD |
| C, A | D, E | CD + AE |
|  |  | CE + AD |
|  |  | AE + CD |
|  |  | AD + CE |
| C, A | E, F | CE + AF |
|  |  | CF + AE |
|  |  | AF + CE |
|  |  | AE + CF |
| C, A | F, D | CF + AD |
|  |  | CD + AF |
|  |  | AD + CF |
|  |  | AF + CD |

The control plane virtual node d4, e4 and the user plane virtual node a4, b4 of the backup pair may reside in different physical units even if the virtual nodes of the serving pair resided in the same physical unit and vice versa.

A directed secondary virtual node pair forms a load allocation alternative LB1. A directed secondary virtual node pair indicates which are the active virtual nodes and standby virtual nodes associated with it. In the load allocation alternative LB1, user plane virtual node a4 and control plane virtual node d4 are active, and user plane virtual node b4 and control plane virtual node e4 are their standby virtual nodes.

Two or more secondary virtual node pairs formed in an equal manner can have different load allocation alternatives which may have other differences apart from the formulation of the secondary virtual node pair.

Load allocation alternatives have external IP addresses that are used as the addresses of the PDP contexts. The address may be different for user plane and control plane. When an activate PDP context request is processed in GGSN, load allocation alternatives for the user plane and control plane are selected. When selecting a load allocation alternative the (initial) serving pair and (initial) backup pair are selected. The IP address of the user plane, e.g. IP address for cluster nodes A and B, and the IP address control plane, e.g. IP address for cluster nodes D and E, are selected. The selection is based for instance on the load information of the cluster nodes or on a specific alternating diagram.

If malfunctioning of a cluster node prevents a virtual node to continue as the active node, the backup virtual node is made the active node. This may be done separately on user plane and control plane. A switchover is thus performed. The active virtual node pair serving the PDP context is put on standby and the corresponding standby virtual node pair becomes active, unless it happens to be in a faulty unit as well. When the corresponding standby units become active units they start serving the PDP contexts. Load allocation of the control plane cluster node does not necessarily have to be changed if the faulty unit is a user plane cluster node, and vice versa.

The routing address of the load allocation alternative is used as the PDP context address of the active virtual node of the load allocation alternative. It is the feature of the load allocation alternative that is visible outside the network element. The IP address is used to indicate the route through the physical interface of the cluster node.

The traffic in the network element NE may be distributed between the cluster nodes that comprise active virtual nodes on the basis of a specific load allocation plan. The traffic in the network element NE may be distributed between the cluster nodes that comprise standby virtual nodes, whereby the standby virtual nodes are made active.

Implementation of the Second Embodiment Using an Internal Switch

Figure 6:
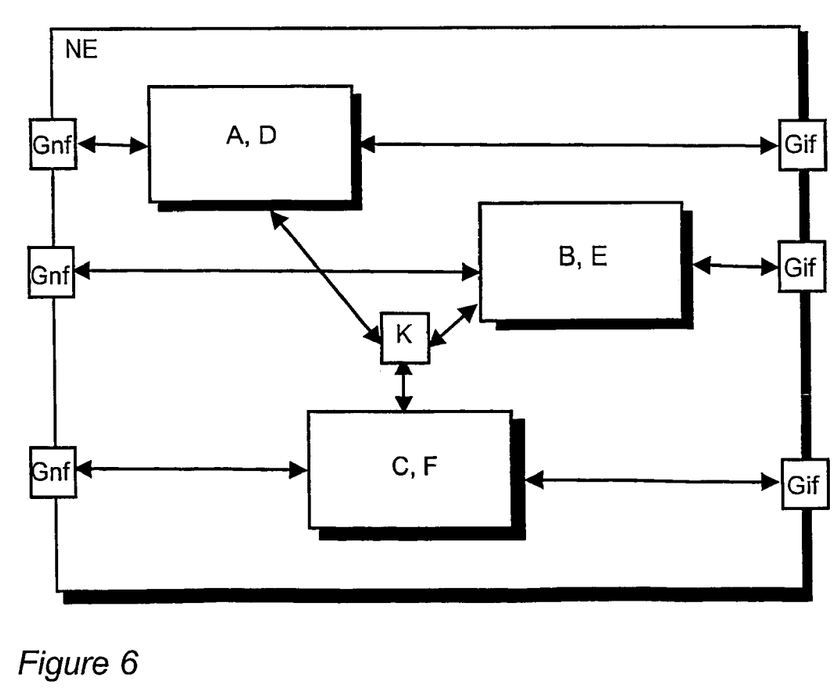
FIG. 6 is a schematic representation of load balancing of the invention on the user plane and control plane, when a high-speed internal switch is available.

FIG. 6 shows the implementation of the invention on the user plane, when GGSN has a high-speed internal switch K or a corresponding connection between the cluster nodes A, B, C, D, E, F. By means of the internal switch K, any alterations required to recover from faults can be hidden at the interfaces of the network element, whereby the change of the active cluster node to the standby node and vice versa is not visible outside the network element NE. Packets arriving at the physical Gi interface Gif or the Gn interface Gnf of the cluster node A, B, C are transmitted through the internal switch K to the active cluster node. For the sake of clarity, FIG. 6 shows one switch K, but in reality, there may be several switches.

According to a preferred embodiment of the invention, load allocation is based on routing protocols (routing based link resiliency), in other words, information on a primary and secondary route to the load allocation alternative is maintained inside GGSN. The primary route is the physical interface of the cluster nodes comprising the serving pair. The secondary route is the physical interface of the cluster nodes comprising the backup pair. When activating a PDP context, the load allocation alternative is offered from a cluster node pair that has capacity available. The physical Gn interface Gnf or physical Gi interface Gif, at which the packets arrive in the network node, need not reside in the cluster nodes from which the load allocation alternative is offered. In other words, the packets can arrive at any interface and they are transmitted through the internal switch K of the network node to the active units. Forwarding information is maintained in GGSN to enable indicating the primary and secondary route through the physical Gi or Gn interface of the cluster node to the active units. The switchover or internal load allocation change of a load allocation alternative is not visible outside the network element, because the IP addresses of the load allocation alternative are the only addresses visible outside the network element. When the primary connection malfunctions, data packets are guided to use the secondary route of the load allocation alternative. A fault in the first interface (for instance Gn) of GGSN is not visible to the second interface (for instance Gi).

According to yet another preferred embodiment of the invention, allocation of PDP contexts is based on a link layer solution (link layer resiliency). In this case, too, the physical Gn interface Gnf or physical Gi interface Gif need not reside in the cluster node pair, in which the active units process packets. In the link layer solution, a load allocation alternative has a physical interface dedicated for it, and the standby units monitor the physical connection or interface Gif, Gnf of the active units. Another GGSN component can also perform the task. If the standby units receive information on a malfunction of the interface used by the active units, the standby units initiate the switchover. The standby units then start to use the backup interface instead of the dedicated physical interface Gif, Gnf of the faulty unit, and packets addressed to the faulty unit are directed to the standby units through the internal switch K. In this embodiment, the switchover or internal load allocation change of the load allocation alternative is not visible outside the network element as a change in the external IP address but as a change in the address on the link layer, because the IP address of the load allocation alternative is the routing address visible outside the network element. When the primary connection malfunctions, data packets are guided to use the secondary route of the load allocation alternative. A fault in the first interface (for instance Gn) of GGSN is not visible to the second interface (for instance Gi).

According to yet another preferred embodiment of the invention, the above-mentioned solution based on routing and the solution of the link layer can be applied simultaneously, in which case first a quick recovery from the malfunction of the cluster node takes place based on the link layer solution and then a recovery based on the routing.

The visibility of a load allocation alternative may be on both sides of the network element NE. This means that there may be a similar feature of the load allocation alternative on the Gi and the Gn side of GGSN. The external addressing of the load allocation alternatives may be based for instance on the subnet address range used for the PDP context IP addresses, the IP tunnel endpoint address in case of a tunneling mechanism (such as GRE, IP-in-IP, or IPSec), or a set of label switched paths used by the load allocation alternative.

Methods for guiding data packets to use a secondary route to the load allocation alternative in a routing-based solution or for starting the use of an alternative physical interface in the link layer solution are described later in 'Changing of the physical interface' of this description.

Implementation of the Second Embodiment Without an Internal Switch

Figure 7:
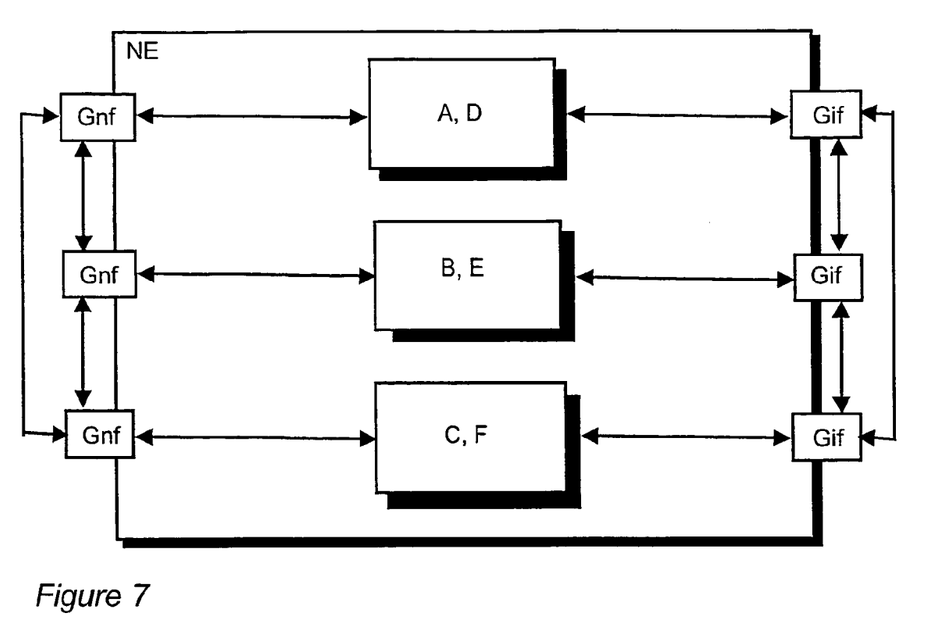
FIG. 7 is a schematic representation of load balancing of the invention on the user plane and control plane, when a high-speed internal switch is not available.

FIG. 7 shows an implementation of the invention on the user plane, when no high-speed internal switch is available in the network element. The load allocation change or a switchover is then not an internal network element change, but is visible outside. In other words, the route of the data packets changes on both interfaces Gn, Gi.

In yet another preferred embodiment of the invention, an integrated load allocation change is performed. In a routing-based solution, data packets then arrive at the network element NE in such a manner that the external address of the load allocation alternative is marked as their IP address. The primary route for transmitting data packets is the one that uses the physical Gi interface Gif or physical Gn interface Gnf of the cluster nodes A, B, C, D, E, F in which the active load allocation alternative resides. When the cluster node malfunctions, the secondary route is used. When using the secondary route, the packets arrive at the physical interface of the cluster nodes, in which the backup pair resides and which then become the active units. The change of the route to the secondary route is visible outside the network element. Routing protocols can be used to indicate the secondary route on the physical interface.

In an integrated load allocation change or a switchover of a preferred embodiment of the invention, it is possible to use a link layer solution that is based on the idea that the standby units of the load allocation alternative monitor the physical Gi interface Gif and physical Gn interface Gnf of the active units. Another GGSN component can also perform this task. If an error is detected, the standby unit starts to use the alternative physical interface of the faulty unit. Methods for changing the physical interface are described later in 'Changing of the physical interface' of this description. The standby unit can then start to use the alternative physical interface, if it is the standby unit of all the PDP contexts whose active unit the faulty unit is. This can be achieved by indicating routes on the physical interface of the standby unit that replaced the faulty unit. Because the Gn-side changes also need to be made on the Gi-side (and vice versa), a logical Gi interface (or Gn interface) is allocated for each load allocation alternative.

The routing solution or the link layer solution can be applied to the Gi interface regardless of which solution is applied to the Gn interface, and vice versa. Methods for guiding data packets to use a secondary route to the load allocation alternative in a routing-based solution or for starting the use of the alternative physical interface in the link layer solution are described next in 'Changing of the physical interface' of this description.

Changing of the Physical Interface

When binding an IP address to a new link layer address in the situations described above, data packets may be lost. Methods for transmitting data arriving at the network element NE to the physical Gi or Gn interface of the active cluster node A, B, C, D, E, F in the situations shown in FIGS. 3, 4, 6 or 7 without a packet loss are the forwarding, unicast and multicast modes. Another benefit of these methods is that a dedicated physical interface is not needed.

The forwarding mode means that one of the cluster nodes serves as the master to the group IP routing address of the network element or to the external address(es) of the load allocation alternative. The master receives the packets addressed to the group IP routing address or to the external address of the load allocation alternative and forwards them to the active cluster node. The forwarding is based for instance on the load allocation alternative address of the data packet. If the master malfunctions, another master is selected in the network element, to which packets addressed to the group IP routing address are thereafter transmitted. The forwarding mode can be applied to the routing-based solutions described earlier in such a manner that the network element either has or does not have an internal switch available to it.

The unicast mode means that data arriving at the network element NE is transmitted separately to each cluster node, even though the data only has one receiver. Each cluster node then receives the packet and either accepts the packet or rejects it depending on the routing address(es) of the load allocation alternative of the data in question. The rejection or the acceptance of the packet may be due the contents of the data packet as well.

The multicast mode means that data can have several simultaneous receivers. The data packet then arrives at the group IP routing address of the network element, from which it is forwarded on in multicasting to all cluster nodes. Depending on the routing address(es) of the load allocation alternative of the data, the cluster node either accepts or rejects the packet. The rejection or the acceptance of the packet may be due the contents of the data packet as well.

Even though the invention is described above with the GTP-U or GTP-C management in GGSN as an example, it is apparent to a person skilled in the art that the invention can also be applied to other protocols. The invention can also be applied to other cluster-implemented network elements. Examples of other network elements, to which the invention can be applied, are a serving GPRS node (SGSN), an IP base transceiver station IP-BTS and a radio access network gateway RAN-GW.

Even though the invention is presented above by describing the redundancy of both the input and output interface and the load allocation of the network element, it is apparent to a person skilled in the art that the invention can also be applied to situations, in which only one of the interfaces is used.

It is apparent to a person skilled in the art that while the technology advances, the basic idea of the invention can be implemented in many different ways. The invention and its embodiments are thus not restricted to the examples described above, but can vary within the scope of the claims.

The invention claimed is:

1. A method, comprising:
   maintaining one or more logical nodes in each of first and second parallel physical cluster nodes configured to transmit data, wherein the first cluster node is a redundancy unit to the second cluster node and vice versa,
   forming load allocation alternatives of the logical nodes, wherein the first logical node of the load allocation alternative resides in the first cluster node and the second logical node resides in the second cluster node, wherein the first logical node is active and the second logical node on standby or vice versa, and
   performing, when a cluster node malfunctions, a switchover of the load allocation alternatives, the active logical nodes of which reside in the faulty cluster node, by changing their logical nodes from standby to active and the active logical nodes to standby,
   wherein a network element in a communications system comprising the first and second cluster nodes is backed-up,
   the method also comprising defining an individual external routing address for each load allocation alternative, on the basis of which data is transmitted to the network element.

2. A method as claimed in claim 1, wherein the load in the network element is distributed between the cluster nodes that comprise active logical nodes.

3. A method as claimed in claim 1, wherein traffic in the network element is distributed between the cluster nodes that comprise logical nodes.

4. A method as claimed in claim 1, wherein traffic in the network element is distributed on the basis of a specific load allocation plan between the cluster nodes that comprise logical nodes.

5. A method as claimed in claim 1, wherein information is further maintained on a primary and secondary cluster node associated with the load allocation alternative, wherein data is transmitted to the primary cluster node and after a switchover of a load allocation alternative, data is transmitted to the secondary cluster node of the load allocation alternative.

6. A method as claimed in claim 1, wherein also a switchover of a load allocation alternative is performed such that after the switchover, data is transmitted through a physical interface of the backup cluster node to the redundancy unit of the cluster node.

7. A method as claimed in claim 1, wherein the network element is backed up without a complete doubling of the number of the cluster nodes.

8. A method as claimed claim 1, wherein said logical nodes are software-associated components of the cluster nodes.

9. A system, comprising:
   a network element that comprises at least first and second parallel physical cluster nodes capable of transmitting data, wherein the first cluster node is configured to serve as a redundancy unit to the second cluster node and vice versa,
   wherein the system is configured to
   maintain logical nodes at least in the first and second cluster node,
   form load allocation alternatives of the logical nodes such that the first logical node of the load allocation alternative resides in the first cluster node and the second logical node in the second cluster node, wherein the first logical node is active and the second on standby or vice versa, and;
   perform, when a cluster node malfunctions, a switchover of the load allocation alternatives, the active logical nodes of which reside in the faulty cluster node, by changing the logical nodes from standby to active and the active logical nodes to standby,
   wherein the system is configured to define for each load allocation alternative an individual external routing address, on the basis of which data is transmitted to the network element.

10. A system as claimed in claim 9, wherein the system is configured to distribute the load in the network element between the cluster nodes comprising active logical nodes.

11. A system as claimed in claim 9, wherein the system is configured to maintain information on a primary and secondary cluster node associated with the load allocation alternative, wherein data is transmitted to the primary cluster node and, after a switchover, data is transmitted to the secondary cluster node of the load allocation alternative.

12. A system as claimed in claim 9, wherein the system is configured to perform a switchover of the load allocation alternative in such a manner that after the switchover, data is transmitted through a physical interface of the backup cluster node to the redundancy unit of the cluster node.

13. A system as claimed in claim 9, wherein the system is also configured
   to maintain information on a cluster node through which the data is forwarded to the active cluster node.

14. A system as claimed in claim 9, wherein the system is also configured to transmit data to one or more cluster nodes of the network element separately, wherein the cluster nodes either reject or receive the data based on a routing address of the load allocation alternative.

15. A system as claimed in claim 9, wherein the system is also configured to transmit data to all cluster nodes of the network element in one go, wherein the cluster nodes either reject the data or receive the data based on a routing address of the load allocation alternative.

16. A system as claimed in claim 9, wherein the system is configured to back up the network element without a complete doubling of the number of the cluster nodes.

17. A system as claimed in claim 9, wherein said logical nodes comprise software associated components of the cluster nodes.

18. An apparatus comprising:
   a first routine configured to maintain logical nodes at least first and the second parallel physical cluster nodes, capable of transmitting data, whereby the first cluster node is a redundancy unit to the second cluster node and vice versa,
   a second routine configured to form load allocation alternatives of the logical nodes such that the first logical node of the load allocation alternative resides in the first cluster node and the second logical node resides in the second cluster node, wherein the first logical node is active and the second on standby or vice versa, and a third routine configured to change, when a cluster node malfunctions, the load allocation of the logical nodes of the load allocation alternatives, the active logical nodes of which reside in the faulty cluster node, by changing the logical nodes from standby to active and the active nodes to standby, wherein the apparatus also comprises a fourth routine configured to define an individual external routing address for each load allocation alternative, on the basis of which data is transmitted to the network element.

19. An apparatus as claimed in claim 18, wherein the apparatus comprises a fourth routine configured to distribute the load in the network element between the cluster nodes that comprise active logical nodes.

20. An apparatus as claimed in claim 18, wherein also comprises a fifth routine configured to distribute traffic in the apparatus between the cluster nodes that comprise logical nodes.

21. An apparatus as claimed in claim 18, wherein it also comprises a sixth routine configured to distribute traffic in the apparatus on the basis of a specific load allocation plan between the cluster nodes that comprise the logical nodes.

22. An apparatus as claimed in claim 18, wherein said first routine is also configured to maintain information on a primary and a secondary cluster node associated with the load allocation alternative, wherein data is transmitted to the primary cluster node, and after a switchover, data is transmitted to the secondary cluster node of the load allocation alternative.

23. An apparatus as claimed in claim 18, wherein the apparatus also comprises an eighth routine configured to change load allocation wherein, after the switchover of a load allocation alternative, data is transmitted through a physical interface of the backup cluster node to the redundancy unit of the cluster node.

24. An apparatus as claimed in claim 18, wherein the apparatus also comprises a ninth routine configured to transmit data by using a routing address defined for the load allocation alternative even after a switchover of the load allocation alternative.

25. An apparatus as claimed in claim 18, wherein the apparatus also comprises a tenth routine configured to perform a switchover of a load allocation alternative inside the apparatus.

26. An apparatus as claimed in claim 18, wherein the apparatus comprises an eleventh routine configured to back up the apparatus without a complete doubling of the number of the cluster nodes.

27. An apparatus as claimed in claim 18, wherein said logical nodes comprise software-associated components of the cluster nodes.

28. An apparatus as claimed in claim 18, wherein the apparatus is a gateway general packet radio service support node.

29. An apparatus, comprising:
maintenance means for maintaining logical nodes at least in first and second parallel physical cluster nodes capable of transmitting data, wherein the first cluster node is a redundancy unit to the second cluster node and vice versa, first forming means for forming load allocation alternatives of the logical nodes such that the first logical node of the load allocation alternative resides in the first cluster node and the second logical node resides in the second cluster node, wherein the first logical node is active and the second on standby or vice versa, and execution means for changing, when a cluster node malfunctions, the load allocation of the logical nodes of the load allocation alternatives, the active logical nodes of which reside in the faulty cluster node, by changing the logical nodes from standby to active and the active nodes to standby, wherein the apparatus also comprises a defining means for defining an individual external routine address for each load allocation alternative, on the basis of which data is transmitted to the network element.

30. An apparatus as claimed in claim 29, wherein the apparatus comprises load allocation means for distributing the load in the apparatus between the cluster nodes that comprise active logical nodes.

31. An apparatus as claimed in claim 29, wherein the apparatus also comprises load allocation means for distributing the traffic in the apparatus between the cluster nodes that comprise logical nodes.

32. An apparatus as claimed in claim 29, wherein the apparatus also comprises load allocation means for distributing the traffic in the apparatus on the basis of a specific load allocation plan between the cluster nodes that comprise logical nodes.

33. An apparatus as claimed in claim 29, wherein said maintenance means are also configured to maintain information on a primary and a secondary cluster node associated with the load allocation alternative, wherein data is transmitted to the primary cluster node and after a switchover, data is transmitted to the secondary cluster node of the load allocation alternative.

34. An apparatus as claimed in claim 29, wherein the apparatus also comprises changing means for changing load allocation in such a manner that after the switchover of a load allocation alternative, data is transmitted through a physical interface of the backup cluster node to the redundancy unit of the cluster node.

35. An apparatus as claimed in claim 29, wherein the apparatus also comprises switching means for transmitting data by using a routing address defined for the load allocation alternative even after a switchover of the load allocation alternative.

36. An apparatus as claimed in claim 29, wherein the apparatus also comprises performing means for performing a switchover of a load allocation alternative inside the network element.

37. An apparatus as claimed in claim 29, wherein the apparatus comprises back up means for backing up the apparatus without a complete doubling of the number of the cluster nodes.

38. An apparatus as claimed in claim 29, wherein said logical nodes are software-associated components of the cluster nodes.

39. An apparatus as claimed in claim 29, wherein the apparatus is a gateway general packet radio service support.

40. An apparatus, comprising:
a processor configured to:
maintaining logical nodes at least in first and second parallel physical cluster nodes capable of transmitting data, wherein the first cluster node is a redundancy unit to the second cluster node and vice versa, form load allocation alternatives of the logical nodes such that the first logical node of the load allocation alternative resides in the first cluster node and the second logical node resides in the second cluster node, wherein the first logical node is active and the second on standby or vice versa, and change, when a cluster node malfunctions, the load allocation of the logical nodes of the load allocation alternatives, the active logical nodes of which reside in the faulty cluster node, by changing the logical nodes from standby to active and the active nodes to standby, wherein the processor is configured to define an individual external routing address for each load allocation alternative, on the basis of which data is transmitted to the network element.

41. An apparatus as claimed in claim 40, wherein the processor is configured to distribute the load in the apparatus between the cluster nodes that comprise active logical nodes.

42. An apparatus as claimed in claim 40, wherein the processor is configured to distribute the traffic in the apparatus between the cluster nodes that comprise logical nodes.

43. An apparatus as claimed in claim 40, wherein the processor is configured to distribute the traffic in the apparatus on the basis of a specific load allocation plan between the cluster nodes that comprise logical nodes.

44. An apparatus as claimed in claim 40, wherein said the processor is configured to maintain information on a primary and a secondary cluster node associated with the load allocation alternative, wherein data is transmitted to the primary cluster node and after a switchover, data is transmitted to the secondary cluster node of the load allocation alternative.

45. An apparatus as claimed in claim 40, wherein the processor is configured to load allocation in such a manner that after the switchover of a load allocation alternative, data is transmitted through a physical interface of the backup cluster node to the redundancy unit of the cluster node.

46. An apparatus as claimed in claim 40, wherein the apparatus also comprises a switch configured to transmit data by using a routing address defined for the load allocation alternative even after a switchover of the load allocation alternative.

47. An apparatus as claimed in claim 40, wherein the processor is configured to perform a switchover of a load allocation alternative inside the network element.

48. An apparatus as claimed in claim 40, wherein the apparatus comprises storage configured to back up the apparatus without a complete doubling of the number of the cluster nodes.

49. An apparatus as claimed in claim 40, wherein said logical nodes are software-associated components of the cluster nodes.

50. An apparatus as claimed in claim 40, wherein the apparatus comprises a gateway general packet radio service support.

* * * * *